(12) United States Patent
Gren et al.

(10) Patent No.: US 9,953,428 B2
(45) Date of Patent: Apr. 24, 2018

(54) DIGITAL CAMERA UNIT WITH SIMULTANEOUS STRUCTURED AND UNSTRUCTURED ILLUMINATION

(71) Applicant: Microsoft Technology Licensing, LLC, Redmond, WA (US)

(72) Inventors: Juuso Gren, Kyröskoski (FI); Tomi Sokeila, Redmond, WA (US); Lassi Ylä-Soininmäki, Hämeenlinna (FI); Kai Jämsä, Lieto (FI); Samuli Wallius, Turku (FI); Antti Peräkamppi, Tampere (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 403 days.

(21) Appl. No.: 14/636,408

(22) Filed: Mar. 3, 2015

(65) Prior Publication Data

US 2016/0260223 A1    Sep. 8, 2016

(51) Int. Cl.
| | |
|---|---|
| *H04N 7/18* | (2006.01) |
| *H04N 9/47* | (2006.01) |
| *G06T 7/00* | (2017.01) |
| *G06K 9/00* | (2006.01) |
| *H04N 5/225* | (2006.01) |
| *H04N 5/33* | (2006.01) |
| *G06K 9/20* | (2006.01) |
| *G06T 7/586* | (2017.01) |

(52) U.S. Cl.
CPC ........ *G06T 7/0073* (2013.01); *G06K 9/00604* (2013.01); *G06K 9/2027* (2013.01); *G06T 7/586* (2017.01); *H04N 5/2256* (2013.01); *H04N 5/2257* (2013.01); *H04N 5/332* (2013.01); *G06T 2207/10028* (2013.01); *G06T 2207/10048* (2013.01); *G06T 2207/10152* (2013.01); *G06T 2207/30201* (2013.01)

(58) Field of Classification Search
None
See application file for complete search history.

(56) References Cited

U.S. PATENT DOCUMENTS

| | | |
|---|---|---|
| 6,714,665 B1 | 3/2004 | Hanna et al. |
| 7,492,927 B2 | 2/2009 | Marschner et al. |
| (Continued) | | |

FOREIGN PATENT DOCUMENTS

| | | |
|---|---|---|
| WO | 2013009235 A1 | 1/2013 |
| WO | 2013049646 A1 | 4/2013 |

OTHER PUBLICATIONS

Zhou, et al., "Template Protection for 3D Face Recognition", Dec. 16, 2014, Available at: http://cdn.intechopen.com/pdfs-wm/10205.pdf.

(Continued)

*Primary Examiner* — Talha M Nawaz
(74) *Attorney, Agent, or Firm* — Alleman Hall Creasman & Tuttle LLP

(57) ABSTRACT

An apparatus is described. In an embodiment, the apparatus comprises an illumination unit configured to simultaneously illuminate a first portion of a scene with unstructured light and a second portion of the scene with structured light. The apparatus further comprises a digital image capture unit configured to capture at least one image frame of the illuminated scene.

18 Claims, 7 Drawing Sheets

(56) References Cited

U.S. PATENT DOCUMENTS

| | | | |
|---|---|---|---|
| 8,723,118 B2 | 5/2014 | McEldowney et al. | |
| 8,970,709 B2 * | 3/2015 | Gonzalez-Banos | G01C 11/02 345/419 |
| 9,063,574 B1 * | 6/2015 | Ivanchenko | G06F 3/017 |
| 9,176,608 B1 * | 11/2015 | Baldwin | G09G 5/00 |
| 2001/0047743 A1 | 12/2001 | Raad et al. | |
| 2012/0105639 A1 * | 5/2012 | Stein | H04N 5/235 348/148 |
| 2012/0242795 A1 | 9/2012 | Kane et al. | |
| 2013/0120311 A1 | 5/2013 | Ichikawa | |
| 2013/0343634 A1 | 12/2013 | Xu et al. | |
| 2014/0118257 A1 * | 5/2014 | Baldwin | G06F 3/017 345/158 |
| 2014/0139633 A1 | 5/2014 | Wang et al. | |
| 2014/0160283 A1 | 6/2014 | Hofman et al. | |
| 2014/0267583 A1 | 9/2014 | Zhu et al. | |
| 2014/0267631 A1 | 9/2014 | Powers et al. | |
| 2014/0293226 A1 * | 10/2014 | Hainzl | A61B 3/113 351/210 |
| 2015/0049063 A1 * | 2/2015 | Smith | G06F 3/0421 345/175 |
| 2015/0276400 A1 * | 10/2015 | Gonzalez-Banos | G06T 7/77 348/169 |
| 2015/0373322 A1 * | 12/2015 | Goma | G03B 17/38 348/21 |
| 2016/0063706 A1 * | 3/2016 | Gonzalez-Banos | G06T 7/73 348/222.1 |

OTHER PUBLICATIONS

Guo, et al., "A System for Automatic Iris Capturing", In Technical Report TR2005-044, Jun. 2005, 10 pages.

Süsstrunk, et al., "Enhancing the Visible with the Invisible: Exploiting NearInfrared to Advance Computational Photography and Computer Vision", In Proceedings 0f 48th Society for Information Display (SID) International Symposium, Seminar and Exhibition, May 23, 2010, 4 pages.

Solano, C., "Chapter 6—Diffractive Optical Components," In Book Handbook of Optical Engineering, Published by CRC Press, May 31, 2001, 22 pages.

Sturm, P. et al., "Chapter 2—Technologies," In Book—Camera Models and Fundamental Concepts Used in Geometric Computer Vision, Published by Now Publishers, Jan. 19, 2011, 28 pages.

ISA European Patent Office, International Search Report and Written Opinion Issued in PCT Application No. PCT/US2016/017048, dated May 17, 2016, WIPO, 12 Pages.

IPEA European Patent Office, Second Written Opinion Issued in PCT Application No. PCT/US2016/017048, dated Jan. 18, 2017, WIPO, 5 Pages.

IPEA European Patent Office, International Preliminary Report on Patentability Issued in PCT Application No. PCT/US2016/017048, dated Apr. 11, 2017, WIPO, 8 Pages.

\* cited by examiner

IR power & Frames exposure

DIGITAL CAMERA UNIT WITH SIMULTANEOUS STRUCTURED AND UNSTRUCTURED ILLUMINATION

BACKGROUND

Infrared (IR) light is sometimes used in digital photography as it is invisible to human eye. Even though IR light may be filtered out in traditional photography, camera sensors are able to detect and measure it. For example, "night vision" in video cameras may utilize IR light to illuminate a scene. Also, IR light may be used for computer vision especially in low-light conditions in order to get more robust illumination than is possible with visible light.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one example, an apparatus comprises an illumination unit configured to simultaneously illuminate a first portion of a scene with unstructured light and a second portion of the scene with structured light; and a digital image capture unit configured to capture at least one image frame of the illuminated scene.

In other examples, a system and a method have been discussed along with the features of the apparatus.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although some of the present examples may be described and illustrated herein as being implemented in a smartphone or a tablet computer, these are only examples of an apparatus and not a limitation. As those skilled in the art will appreciate, the present examples are suitable for application in a variety of different types of apparatuses incorporating a digital image capture unit or a digital imaging system, for example, a stand-alone digital camera device, e.g. a compact camera, a SLR (Single-Lens Reflex) camera, or a mirrorless interchangeable-lens camera.

Figure 1:
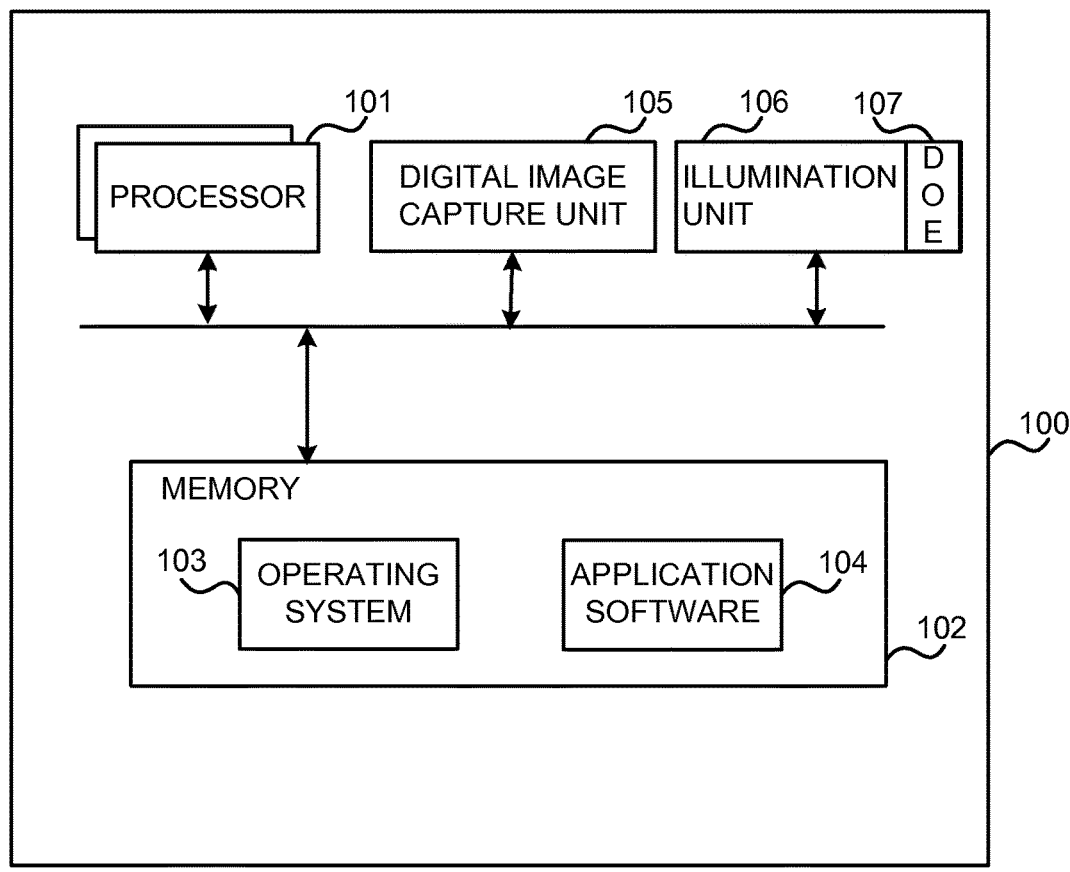
FIG. 1 is a block diagram of one example of a apparatus.

FIG. 1 shows a block diagram of one example of an apparatus 100 which may be implemented as any form of a computing device and/or electronic device that incorporates a digital image capture unit or a digital imaging system. For example, the apparatus 100 may be implemented as a stand-alone digital camera device, e.g. a compact camera, a SLR camera, or a mirrorless interchangeable-lens camera, or the apparatus 100 may be implemented e.g. as a smartphone, a tablet computer, a wearable camera or a web camera.

The apparatus 100 comprises an illumination unit 106. The illumination unit 106 is configured to simultaneously illuminate a first portion of a scene with unstructured light and a second portion of the scene with structured light. The second portion of the scene may overlap the first portion of the scene partially, completely, or not at all. The unstructured light and/or the structured light may comprise light invisible to human eye, such as infrared light or ultraviolet light. The illumination unit 106 may be implemented e.g. as light-emitting diode (LED).

The illumination unit 106 may comprise a diffractive optical element (DOE) 107 that is configured to provide the structured light. The diffractive optical element 107 may be switchable. The diffractive optical element 107 may be implemented e.g. as a lens that may be installed e.g. in front of the illumination unit 106 so that the light emitting from the illumination unit 106 passes through the lens. The diffractive optical element 107 may comprise a first part configured to allow the light emitting from the illumination unit 106 pass through unaltered, thereby providing the unstructured light. The diffractive optical element 107 may further comprise a second part configured to cause predetermined patterns in the light emitting from the illumination unit 106, thereby providing the structured light.

The apparatus 100 further comprises a digital image capture unit 105. The digital image capture unit 105 is configured to capture at least one image frame of the illuminated scene. The digital image capture unit 105 may comprise at least an optical system including a lens arrangement and an image sensor, such as a charge-coupled device (CCD) sensor or a complementary metal-oxide-semiconductor (CMOS) sensor. The digital image capture unit 105 may further comprise a rolling shutter. The scene may comprise a region of interest, and the illumination unit 106 may be further configured to illuminate the region of interest with higher power than the rest of the scene.

Figure 2:
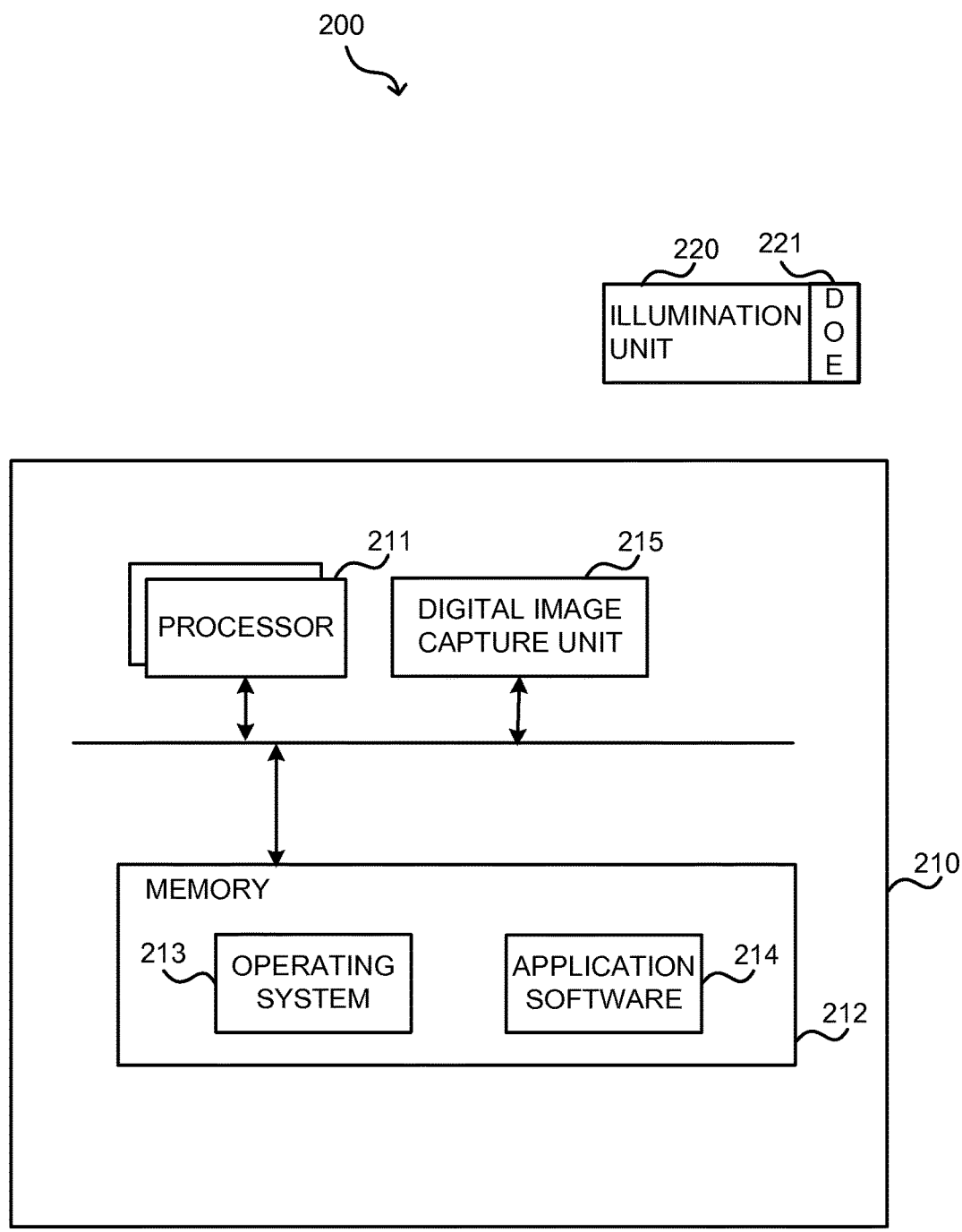
FIG. 2 is a block diagram of one example of a system.

FIG. 2 shows a block diagram of one example of a system 200. The system 200 comprises an apparatus 210 which may be implemented as any form of a computing device and/or electronic device that incorporates a digital image capture unit or a digital imaging system. For example, the apparatus 210 may be implemented as a stand-alone digital camera device, e.g. a compact camera, a SLR camera, or a mirrorless interchangeable-lens camera, or the apparatus 210 may be implemented e.g. as a smartphone, a tablet computer, a wearable camera or a web camera.

The system 200 comprises an illumination unit 220. The illumination unit 220 is configured to simultaneously illuminate a first portion of a scene with unstructured light and a second portion of the scene with structured light. The second portion of the scene may overlap the first portion of the scene partially, completely, or not at all. The unstructured light and/or the structured light may comprise light invisible to human eye, such as infrared light or ultraviolet light. The illumination unit 220 may be implemented e.g. as light-emitting diode (LED). The illumination unit 220 is re-attachable to the apparatus 210.

The illumination unit 220 may comprise a diffractive optical element (DOE) 221 that is configured to provide the structured light. The diffractive optical element 221 may be switchable. The diffractive optical element 221 may be implemented e.g. as a lens that may be installed e.g. in front of the illumination unit 220 so that the light emitting from the illumination unit 220 passes through the lens. The diffractive optical element 221 may comprise a first part configured to allow the light emitting from the illumination unit 220 pass through unaltered, thereby providing the unstructured light. The diffractive optical element 221 may further comprise a second part configured to cause predetermined pattern(s) in the light emitting from the illumination unit 220, thereby providing the structured light.

The apparatus 210 further comprises a digital image capture unit 215. The digital image capture unit 215 is configured to capture at least one image frame of the illuminated scene. The digital image capture unit 215 may comprise at least an optical system including a lens arrangement and an image sensor, such as a charge-coupled device (CCD) sensor or a complementary metal-oxide-semiconductor (CMOS) sensor. The digital image capture unit 215 may further comprise a rolling shutter. The scene may comprise a region of interest, and the illumination unit 220 may be further configured to illuminate the region of interest with higher power than the rest of the scene.

The apparatuses 100, 210 may comprise one or more processors 101, 211 which may be microprocessors, controllers or any other suitable type of processors for processing computer executable instructions to control the operation of the apparatuses 100, 210. Platform software comprising an operating system 103, 213 or any other suitable platform software may be provided at the apparatuses 100, 210 to enable application software 104, 214 to be executed on the device.

Computer executable instructions may be provided using any computer-readable media that is accessible by the apparatuses 100, 210. Computer-readable media may include, for example, computer storage media such as memory 102 and communications media. Computer storage media, such as memory 102, 212, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 102, 212) is shown within the apparatuses 100, 210 it will be appreciated that the storage may be distributed or located remotely and accessed via a network or other communication link.

Figure 3:
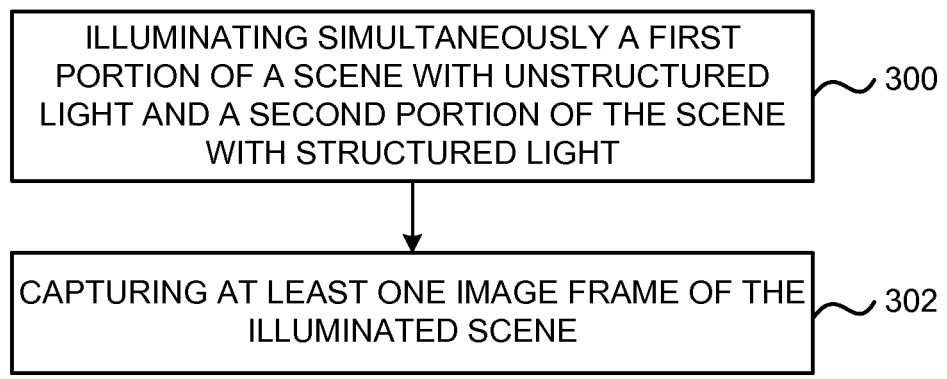
FIG. 3 is a flow diagram of one example of a method.

FIG. 3 shows a method which can be used to simultaneously illuminate a scene with both unstructured light and structured light. At step 300, a first portion of a scene is illuminated with unstructured light using a single illumination unit, and simultaneously a second portion of the scene is illuminated with structured light using the same illumination unit. At step 302 at least one image frame of the illuminated scene is captured using a digital image capture unit.

As discussed above, the second portion of the scene may overlap the first portion of the scene partially, completely, or not at all. The unstructured light and/or the structured light may comprise light invisible to human eye, such as infrared light or ultraviolet light.

Figure 4:
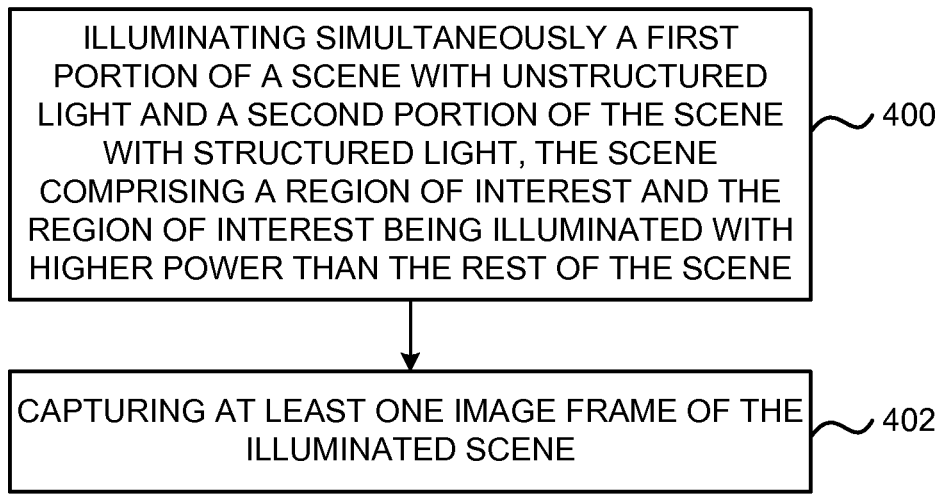
FIG. 4 is a flow diagram of another example of a method.

FIG. 4 shows a method which can be used to simultaneously illuminate a scene with both unstructured light and structured light. At step 400, a first portion of a scene is illuminated with unstructured light using a single illumination unit, and simultaneously a second portion of the scene is illuminated with structured light using the same illumination unit.

In the example of FIG. 4, the scene comprises a region of interest, and the illuminating step 400 comprises illuminating the region of interest with higher power than the rest of the scene. At step 402 at least one image frame of the illuminated scene is captured using a digital image capture unit.

As discussed above, the second portion of the scene may overlap the first portion of the scene partially, completely, or not at all. The unstructured light and/or the structured light may comprise light invisible to human eye, such as infrared light or ultraviolet light.

Figure 5:
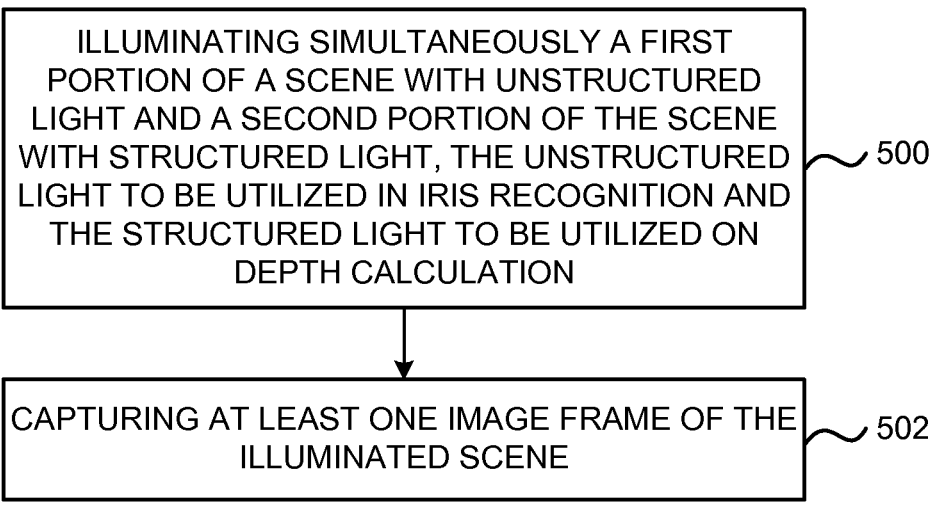
FIG. 5 is a flow diagram of another example of a method.

FIG. 5 shows a method which can be used to simultaneously illuminate a scene with both unstructured light and structured light. At step 500, a first portion of a scene is illuminated with unstructured light using a single illumination unit, and simultaneously a second portion of the scene is illuminated with structured light using the same illumination unit.

In the example of FIG. 5, the unstructured light is utilized in iris recognition and the structured light is utilized in depth calculation. At step 502 at least one image frame of the illuminated scene is captured using a digital image capture unit.

As discussed above, the second portion of the scene may overlap the first portion of the scene partially, completely, or not at all. The unstructured light and/or the structured light may comprise light invisible to human eye, such as infrared light or ultraviolet light.

Figure 6:
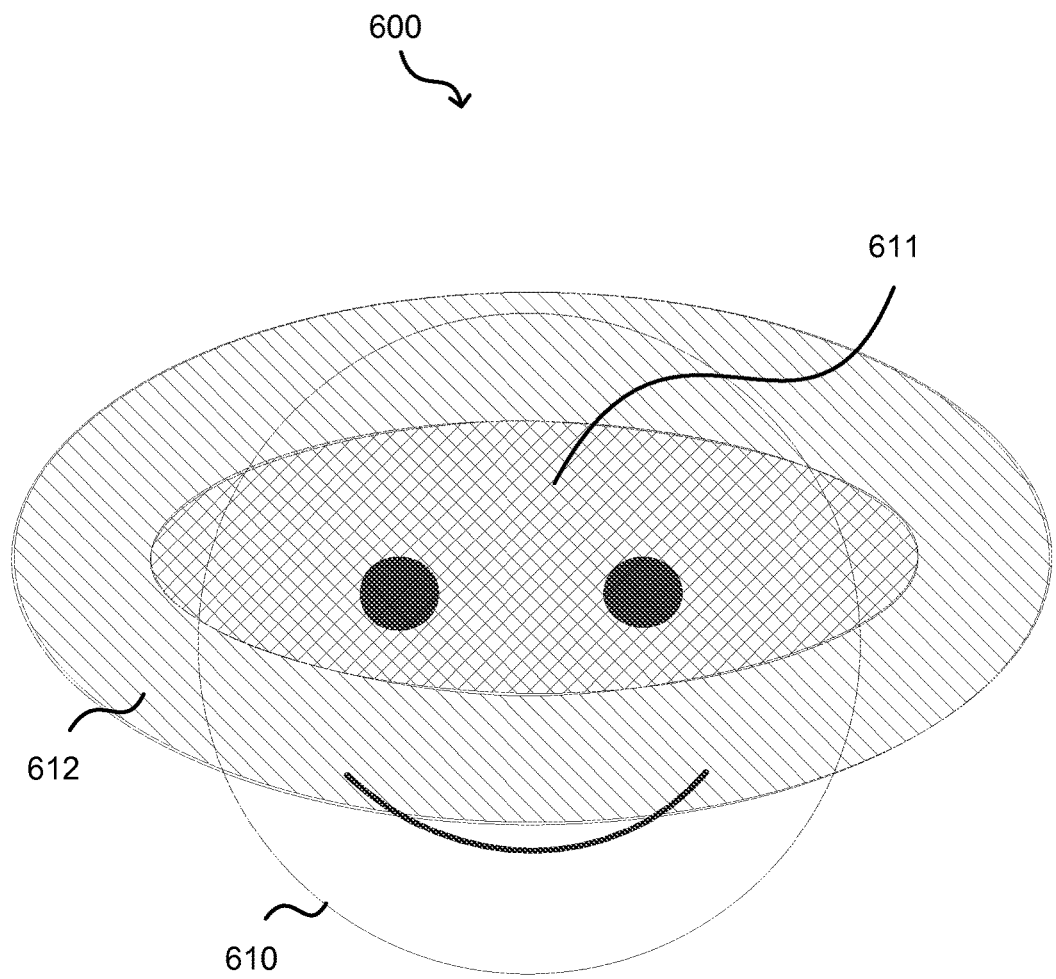
FIG. 6 illustrates a scene comprising a human face with the first portion being an area around the eyes and the second portion being an area around the first portion.

FIG. 6 illustrates a scene 600 that comprises a human face 610. The first portion 611 illuminated with the unstructured light is an area around the eyes and the second portion 612 illuminated with the structured light is an area around the first portion. The second portion 612 of the scene 600 may overlap the first portion 611 of the scene 600 partially, completely, or not at all. Here, the unstructured light may be utilized e.g. in iris recognition and the structured light may be utilized e.g. in depth calculation.

The scene may comprise more than two portions, at least some of which may be illuminated with similar structured light as the second portion or with structured light having a different structure than that of the structured light illuminating the second portion. For example, a dense structure may be used on a portion requiring more accuracy and a sparse structure may be used on a portion requiring less accuracy.

Figure 7:
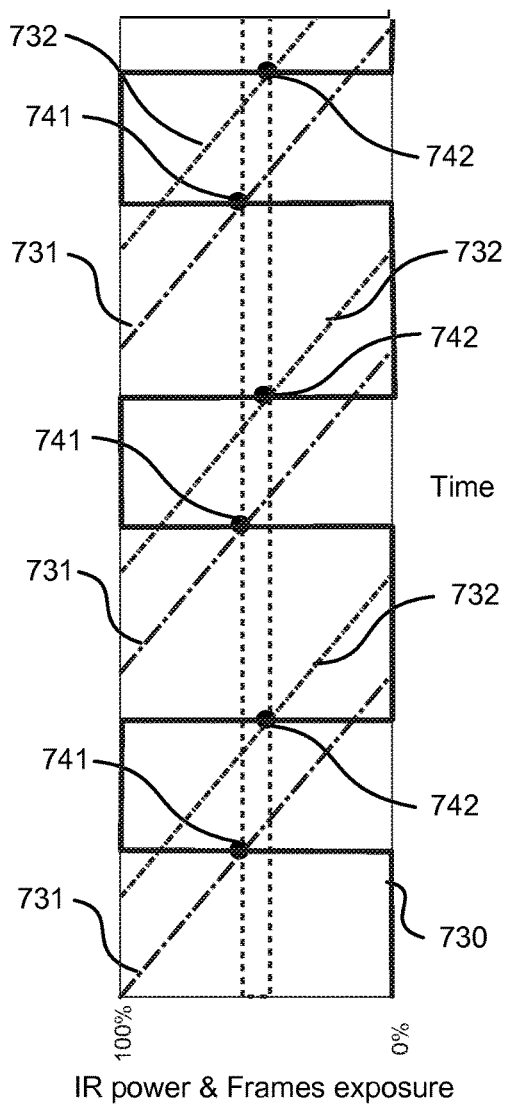
FIG. 7 is a diagram illustrating illumination of a region of interest with higher power than the rest of the scene.
Figure 7:
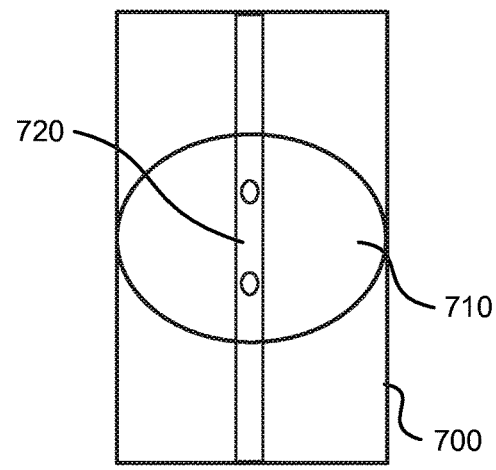

FIG. 7 illustrates illumination of a region of interest with higher power than the rest of the scene. The scene 700 comprises a human face 710. In addition to the scene having the first portion illuminated with the unstructured light and the second portion illuminated with the structured light, as discussed above, the scene 700 further comprises a region of interest 720 (ROI). In the example of FIG. 7 related to iris recognition, the region of interest 720 includes eye area or iris area. The region of interest 720 may overlap the first portion of the scene and/or the second portion of the scene.

Curve 730 represents power or current used to control the illumination unit or LED. The example of FIG. 7 relates to a digital image capture unit comprising a rolling shutter. In other words, exposure and frame read-out starts from a top row, and bottom row exposure may start e.g. tens of milliseconds later than the top row one. Accordingly, lines 731 represent row exposure start, and lines 732 represent row exposure stop. Points 741 represent the moments of time when the illumination unit is turned on or to high power (i.e. when the rolling shutter exposure reaches the top of the ROI indicated by the upper dash line), and points 742 represent the moments of time when the illumination unit is turned off or to low power (i.e. when the rolling shutter exposure reaches the bottom of the ROI indicated by the lower dash line).

In the example of FIG. 7, illumination unit or LED may be turned on and off synchronized to the frame read-out of the digital image capture unit so that only e.g. iris area (ROI) 720 is illuminated with high power. Alternatively, instead of turning the IR light on and off, it may be turned to high power and low power. This may be more convenient for the eyes, as illumination source flickering is not as visible if there is some light emitting all the time. For example, substantially 20% power may be used outside the ROI, whereas substantially 100% power may be used within the ROI.

Iris recognition typically utilizes an infrared illumination unit and digital image capture unit matching the IR wavelengths. Typically, near-infrared (NIR) is used. However, a human eye can usually see also some part of the NIR radiation, so a NIR illumination unit may be visible to users. Especially, if NIR wavelength is close to red color (i.e. close to 800 nm), the NIR illumination unit may actually look like a normal red LED. Furthermore, IR radiation may be harmful for the eye, if power is high and/or exposure time is long.

The example of FIG. 7 allows reducing the average power emitting from the illumination unit. Reducing average power level may facilitate making e.g. an IR illumination unit less visible/irritating and less harmful for the eyes. Furthermore, if required IR energy for a proper exposure at distance x is 100%, then due to the inverse square law, required IR energy at 2x distance is 400%. Accordingly, being able to reduce the average power emitting from the illumination unit is beneficial.

At least some of the examples disclosed in FIGS. 1-7 are able to provide simultaneous illumination of a scene with both unstructured light and structured light using a single illumination unit. As discussed above, the unstructured light may be utilized e.g. in iris recognition and the structured light may be utilized e.g. in depth calculation.

This may provide more secure authentication, since on parallel with iris recognition it could be verified that the visible object has a three-dimensional (3D) shape of a face (i.e. it is not e.g. paper or display). Also, utilizing facial 3D information may provide more secure authentication. Furthermore, depth information may be utilized for optimization of image capture parameters, such as to guide auto-focus, auto-exposure and/or illumination unit control. Furthermore, depth information may be utilized for safety decisions, such as for turning off the illumination unit when a face comes closer to the apparatus than a predetermined threshold. Furthermore, depth information may be utilized for power optimizations, such as for detecting when there is nothing in front of the apparatus and in response turning the illumination unit power off/lower. Furthermore, depth information may be utilized for e.g. removing/blurring a background in a video call. Furthermore, at least some of the examples disclosed in FIGS. 1-7 may be used underwater and/or in darkness, since they do not rely on external light sources, such as sunlight or room lighting.

An embodiment of an apparatus comprises an illumination unit configured to simultaneously illuminate a first portion of a scene with unstructured light and a second portion of the scene with structured light; and a digital image capture unit configured to capture at least one image frame of the illuminated scene.

In an embodiment, alternatively or in addition, the digital image capture unit comprises a rolling shutter.

In an embodiment, alternatively or in addition, the scene comprises a region of interest, and the illumination unit is further configured to illuminate the region of interest with higher power than the rest of the scene.

In an embodiment, alternatively or in addition, the second portion of the scene overlaps the first portion of the scene at least partially.

In an embodiment, alternatively or in addition, the illumination unit comprises a diffractive optical element configured to provide the structured light.

In an embodiment, alternatively or in addition, the diffractive optical element is switchable.

In an embodiment, alternatively or in addition, the first portion of the scene comprises a human eye and the unstructured light is utilized in iris recognition.

In an embodiment, alternatively or in addition, the structured light is utilized in depth calculation.

In an embodiment, alternatively or in addition, at least one of the unstructured light and the structured light comprises light invisible to human eye.

In an embodiment, alternatively or in addition, the invisible light comprises one of infrared light and ultraviolet light.

In an embodiment, alternatively or in addition, the apparatus comprises a mobile communication device.

An embodiment of a system comprises an apparatus comprising a digital image capture unit; and an illumination unit configured to simultaneously illuminate a first portion of a scene with unstructured light and a second portion of the scene with structured light, the illumination unit being re-attachable to the apparatus, wherein the digital image capture unit is configured to capture at least one image frame of the illuminated scene.

In an embodiment, alternatively or in addition, the digital image capture unit comprises a rolling shutter.

In an embodiment, alternatively or in addition, the scene comprises a region of interest, and the illumination unit is further configured to illuminate the region of interest with higher power than the rest of the scene.

In an embodiment, alternatively or in addition, the second portion of the scene overlaps the first portion of the scene at least partially.

In an embodiment, alternatively or in addition, the illumination unit comprises a diffractive optical element configured to provide the structured light.

In an embodiment, alternatively or in addition, the diffractive optical element is switchable.

In an embodiment, alternatively or in addition, the first portion of the scene comprises a human eye and the unstructured light is utilized in iris recognition.

In an embodiment, alternatively or in addition, the structured light is utilized in depth calculation.

In an embodiment, alternatively or in addition, at least one of the unstructured light and the structured light comprises light invisible to human eye.

In an embodiment, alternatively or in addition, the invisible light comprises one of infrared light and ultraviolet light.

In an embodiment, alternatively or in addition, the apparatus comprises a mobile communication device.

An embodiment of a method comprises illuminating, with an illumination unit, simultaneously a first portion of a scene with unstructured light and a second portion of the scene with structured light; and capturing, with a digital image capture unit, at least one image frame of the illuminated scene.

In an embodiment, alternatively or in addition, the digital image capture unit comprises a rolling shutter.

In an embodiment, alternatively or in addition, the scene comprises a region of interest, and the illuminating comprises illuminating the region of interest with higher power than the rest of the scene.

In an embodiment, alternatively or in addition, the second portion of the scene overlaps the first portion of the scene at least partially.

In an embodiment, alternatively or in addition, the illumination unit comprises a diffractive optical element configured to provide the structured light.

In an embodiment, alternatively or in addition, the diffractive optical element is switchable.

In an embodiment, alternatively or in addition, the first portion of the scene comprises a human eye and the unstructured light is utilized in iris recognition.

In an embodiment, alternatively or in addition, the structured light is utilized in depth calculation.

In an embodiment, alternatively or in addition, the method further comprises at least one of utilizing the unstructured light in iris recognition and utilizing the structured light in depth calculation.

In an embodiment, alternatively or in addition, at least one of the unstructured light and the structured light comprises light invisible to human eye.

In an embodiment, alternatively or in addition, the invisible light comprises one of infrared light and ultraviolet light.

In an embodiment, alternatively or in addition, the apparatus comprises a mobile communication device.

An embodiment of an apparatus comprises an illumination unit; a digital image capture unit; at least one processor, and at least one memory storing program instructions that, when executed by the at least one processor, cause the apparatus to: illuminate, with the illumination unit, simultaneously a first portion of a scene with unstructured light and a second portion of the scene with structured light; and capture, with a digital image capture unit, at least one image frame of the illuminated scene.

An embodiment of a computer-readable storage medium comprises executable instructions for causing at least one processor of an apparatus to perform operations comprising: illuminating, with an illumination unit, simultaneously a first portion of a scene with unstructured light and a second portion of the scene with structured light; and capturing, with a digital image capture unit, at least one image frame of the illuminated scene.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include mobile telephones (including smart phones), tablet computers and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An apparatus, comprising:
    an illumination unit configured to simultaneously illuminate a first portion of a scene with unstructured light and a second portion of the scene with structured light;
    and a digital image capture unit including a rolling shutter and configured to capture at least one image frame of the scene illuminated by the illumination unit, and
    wherein the illumination unit is configured to selectively adjust illumination of the scene based on a position of the rolling shutter to illuminate a region of interest of the scene with higher power than the rest of the scene by operating the illumination unit at a first, higher power setting responsive to an exposure of the rolling shutter being within the region of interest and by operating the illumination unit at a second, reduced power setting responsive to an exposure of the rolling shutter being outside the region of interest.

2. The apparatus as claimed in claim 1, wherein the second portion of the scene overlaps the first portion of the scene at least partially.

3. The apparatus as claimed in claim 1, wherein the illumination unit comprises a diffractive optical element configured to provide the structured light.

4. The apparatus as claimed in claim 3, wherein the diffractive optical element is switchable.

5. The apparatus as claimed in claim 1, wherein the first portion of the scene comprises a human eye and the unstructured light is utilized in iris recognition.

6. The apparatus as claimed in claim 1, wherein the structured light is utilized in depth calculation.

7. The apparatus as claimed in claim 1, wherein at least one of the unstructured light and the structured light comprises light invisible to human eye.

8. The apparatus as claimed in claim 7, wherein the invisible light comprises one of infrared light and ultraviolet light.

9. The apparatus as claimed in claim 1, wherein the apparatus comprises a mobile communication device.

10. The apparatus of claim 1, wherein the illumination unit emits light when operating at the second, reduced power setting.

11. A system, comprising:
    an apparatus comprising a digital image capture unit; and
        an illumination unit configured to simultaneously illuminate a first portion of a scene with unstructured light and a second portion of the scene with structured light, the illumination unit being re-attachable to the apparatus,
        wherein the digital image capture unit includes a rolling shutter and is configured to capture at least one image frame of the scene illuminated by the illumination unit, and
        wherein the illumination unit is configured to selectively adjust illumination of the scene based on a position of the rolling shutter to illuminate a region of interest of the scene with higher power than the rest of the scene by operating the illumination unit at a first, higher power setting responsive to an exposure of the rolling shutter being within the region of interest and by operating the illumination unit at a second, reduced power setting responsive to an exposure of the rolling shutter being outside the region of interest.

12. The system of claim 11, wherein the illumination unit emits light when operating at the second, reduced power setting.

13. The system as claimed in claim 11, wherein the illumination unit comprises a diffractive optical element configured to provide the structured light.

14. The system as claimed in claim 13, wherein the diffractive optical element is switchable.

15. The system as claimed in claim 11, wherein the apparatus comprises a mobile communication device.

16. A method, comprising:
    illuminating, with an illumination unit, simultaneously a first portion of a scene with unstructured light and a second portion of the scene with structured light;
    capturing, with a digital image capture unit that includes a rolling shutter, at least one image frame of the scene illuminated with the illumination unit; and
    via the illumination unit, selectively adjusting illumination of the scene based on a position of the rolling shutter to illuminate a region of interest of the scene with higher power than the rest of the scene by operating the illumination unit at a first, higher power setting responsive to an exposure of the rolling shutter being within the region of interest and by operating the illumination unit at a second, reduced power setting responsive to an exposure of the rolling shutter being outside the region of interest.

17. The method as claimed in claim 16, further comprising at least one of utilizing the unstructured light in iris recognition and utilizing the structured light in depth calculation.

18. The method of claim 16, wherein the illumination unit emits light when operating at the second, reduced power setting.

* * * * *